(12) United States Patent
Koike

(10) Patent No.: US 12,016,319 B2
(45) Date of Patent: Jun. 25, 2024

(54) COMPONENT OF FISHING REEL

(71) Applicant: GLOBERIDE, Inc., Tokyo (JP)

(72) Inventor: Mamoru Koike, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 341 days.

(21) Appl. No.: 16/244,726

(22) Filed: Jan. 10, 2019

(65) Prior Publication Data
US 2019/0216070 A1    Jul. 18, 2019

(30) Foreign Application Priority Data

Jan. 12, 2018  (JP) .................................. 2018-003643

(51) Int. Cl.
| | | |
|---|---|---|
| *A01K 89/015* | (2006.01) | |
| *C23C 2/12* | (2006.01) | |
| *C23C 2/26* | (2006.01) | |
| *C23C 24/08* | (2006.01) | |
| *C23C 28/00* | (2006.01) | |

(52) U.S. Cl.
CPC .............. *A01K 89/015* (2013.01); *C23C 2/12* (2013.01); *C23C 2/26* (2013.01); *C23C 24/08* (2013.01); *C23C 24/087* (2013.01); *C23C 28/30* (2013.01); *C23C 28/322* (2013.01); *C23C 28/345* (2013.01)

(58) Field of Classification Search
None
See application file for complete search history.

(56) References Cited

U.S. PATENT DOCUMENTS

| | | | |
|---|---|---|---|
| 8,746,604 B2 | 6/2014 | Niitsuma et al. | |
| 8,925,846 B2 * | 1/2015 | Niitsuma ........... | A01K 89/0193 242/310 |
| 2003/0111569 A1 | 6/2003 | Hitomi | |
| 2013/0112795 A1 | 5/2013 | Niitsuma et al. | |

(Continued)

FOREIGN PATENT DOCUMENTS

| | | |
|---|---|---|
| CN | 1466416 A | 1/2004 |
| CN | 102652506 A | 9/2012 |

(Continued)

OTHER PUBLICATIONS

Notice of Reasons for Refusal dated Feb. 18, 2021, of countelpart Japanese Application No. 2018-003643, along with an English translation.

(Continued)

*Primary Examiner* — Kim S. Horger
(74) *Attorney, Agent, or Firm* — Oliff PLC

(57) ABSTRACT

The present invention provides a component of a fishing reel that make it possible to achieve precise finished dimensions and improve the efficiency of the entire surface treatment while maintaining a bright and substantial external appearance with a metallic feeling and corrosion resistance. The component of a fishing reel according to the present invention is formed of a die-cast material and includes: a first surface treatment region including a coating layer and an anodic oxide film, the coating layer being formed on the die-cast material and formed of aluminum with a higher aluminum purity than the die-cast material, the anodic oxide film being formed on the coating layer; and a second surface treatment region including an anodic oxide film formed on the die-cast material.

7 Claims, 9 Drawing Sheets

(56) References Cited

U.S. PATENT DOCUMENTS

2013/0153700 A1* 6/2013 Niitsuma ............. A01K 89/015
242/310
2014/0291430 A1* 10/2014 Takamatsu ........... A01K 89/015
242/283
2017/0145950 A1 5/2017 Yamashita

FOREIGN PATENT DOCUMENTS

| CN | 103081876 | A | 5/2013 |
| CN | 106609370 | A | 5/2017 |
| CN | 206751952 | U | 12/2017 |
| JP | 54-31744 | B2 | 10/1979 |
| JP | H03281796 | A | 12/1991 |
| JP | H07238396 | A | 9/1995 |
| JP | 2001-045926 | A | 2/2001 |
| JP | 2005-013153 | A | 1/2005 |
| JP | 3109399 | U | 3/2005 |
| JP | 2016037660 | A | 3/2016 |

OTHER PUBLICATIONS

First Office Action dated Jan. 11, 2021, of counterpart Chinese Application No. 201910022762.4. along with an English translation.
Notice of Reasons for Refusal dated Apr. 22, 2021, of counterpart Japanese Application No. 2018-003643, along with an English translation.
Chinese Office Action for related Chinese Application No. 201910022762.4; action dated Jun. 15, 2021; (7 pages).
Japanese Office Action for related Japanese Application No. 2021-115584; action dated Jun. 2, 2022; (6 pages).
Third Chinese Office Action for related Chinese Patent Application No. 201910022762.4; report dated Jan. 14, 2022; (10 pages).
Japanese Rejection Decision in connection with Japanese Patent Application No. 2021-115584; action dated Dec. 1, 2022; (2 pages).
Japanese Decision of Dismissal of Amendment in connection with Japanese Patent Application No. 2021-115584; action dated Dec. 1, 2022; (7 pages).
Japanese Final Office Action in connection with Japanese Patent Application No. 2021-115584; action dated Sep. 15, 2022; (8 pages).

* cited by examiner

COMPONENT OF FISHING REEL

CROSS-REFERENCE TO RELATED APPLICATIONS

This application is based on and claims the benefit of priority from Japanese Patent Application Serial No. 2018-003643 (filed on Jan. 12, 2018), the contents of which are hereby incorporated by reference in their entirety.

TECHNICAL FIELD

The present invention relates to a component of various types of fishing reels such as spinning reels, and in particular to a component of fishing reels subjected to improved surface treatment.

BACKGROUND

In general, fishing reels are used in a harsh outdoor environment where seawater, water, foreign substances and the like tend to adhere thereto, and therefore, fishing reels are required to have durability, as well as a light weight for easier holding and carrying. It has been conventionally proposed to mold a component exposed outside a reel body or the like to a desired shape by die casting, or casting a molten die-cast material such as an aluminum alloy into a die and applying a high pressure (see, for example, Japanese Patent Publication No. Sho 54-31744). The aluminum die-cast mold is subjected to pre-cleansing treatment and polishing and then finished by alumite treatment (anodic oxidation of aluminum), dyeing, and sealing, or the aluminum die-cast mold is subjected to pre-cleansing treatment and then surface-treated by undercoating, base alumite treatment, and decorative top coating (exterior coating).

When a die-cast mold of a material containing much impurity is subjected to alumite treatment and exterior decorating (dyeing), such a die-cast mold hardly has a bright and substantial external appearance with a metallic feeling and tends to have poor corrosion resistance. To overcome these defects, it is disclosed in Japanese Patent Application Publication No. 2005-13153 for example, to form on a die-cast mold a coating layer formed of aluminum with a higher aluminum purity than the die-cast mold and form on the coating layer an anti-corrosion layer by anodic oxidation, so as to achieve a bright and substantial external appearance with a metallic feeling and corrosion resistance.

Components of a fishing reel such as a reel body are constituted by various parts including an outer surface part (an exterior part) exposed to the outer environment and precision finishing parts such as a bearing and a screw hole required to be finished to a high dimensional precision. Forming a coating layer and an anti-corrosion layer uniformly on all the parts of the various die-cast molds results in one problem.

That is, the precision finishing parts are generally subject to a severe dimensional tolerance and have an elaborate shape, and therefore, it is difficult and takes much effort to form a coating layer on the precision finishing parts. Moreover, when a coating layer is formed on the precision finishing parts, it is difficult to achieve a high dimensional precision and to accomplish desired precision finishing. The outer surface parts, exposed to the outside, are required to have a bright and substantial external appearance with a metallic feeling and corrosion resistance over the entire surface thereof. Therefore, an attempt to form a coating layer and an anti-corrosion layer uniformly on all the parts of the die-cast molds in which the precision finishing parts and the outer surface parts are mixed together reduces the efficiency of the entire surface treatment and makes it difficult to maintain a high dimensional precision.

As described above, in the surface treatment of the components of a fishing reel such as a reel body in which different types of parts are mixed together, it is an urgent issue how to achieve precise finished dimensions and improve the efficiency of the surface treatment while maintaining the bright and substantial external appearance with a metallic feeling and corrosion resistance.

SUMMARY

The present invention addresses the above issue and one object thereof is to provide a component of a fishing reel that make it possible to achieve precise finished dimensions and improve the efficiency of the entire surface treatment while maintaining the bright and substantial external appearance with a metallic feeling and corrosion resistance.

To achieve the above object, the present invention provides a component of a fishing reel formed of a die-cast material, the component comprising: a first surface treatment region including a coating layer and an anti-corrosion layer, the coating layer being formed on the die-cast material and formed of aluminum with a higher aluminum purity than the die-cast material, the anti-corrosion layer being formed on the coating layer by anodic oxidation, and a second surface treatment region including an anti-corrosion layer formed on the die-cast material by anodic oxidation.

According to the above configuration, in the first surface treatment region, the anti-corrosion layer formed on the coating layer by anodic oxidation has an increased corrosion resistance and rust resistance and also has a bright and substantial external appearance with a metallic feeling, as well as a high surface hardness, because of the action of the coating layer made of high purity aluminum. The second surface treatment region is inferior to the first surface treatment region in the quality of the bright and substantial external appearance with a metallic feeling, but it has a sufficient corrosion resistance and a high wear resistance against scratches that result in a higher endurance, and in addition, absence of the coating layer simplifies the surface treatment and facilitates finishing to a high dimensional precision.

Particularly in the above configuration, it is preferable that the precision finishing parts of the reel component (the die-cast mold) required to be finished to a predetermined dimensional precision are formed as the second surface treatment region, and the surface parts of the reel component other than the precision finishing parts are formed as the first surface treatment region. As described above, the precision finishing parts are generally subject to a severe dimensional tolerance and have an elaborate shape, and therefore, it is difficult and takes much effort to form the coating layer on the precision finishing parts. Moreover, when the coating layer is formed on the precision finishing parts, it is difficult to achieve a high dimensional precision and to accomplish desired precision finishing. In the embodiment, the precision finishing parts are arranged to correspond to the second surface treatment region where the coating layer is absent, such that the precision finishing parts can be finished to a high dimensional precision, while the surface parts (the first surface treatment region) maintains a bright and substantial external appearance with a metallic feeling and corrosion resistance. As a result, the efficiency of the entire surface treatment can be improved, the precision finishing parts P are masked when the coating layer is formed (or the coating layer on the precision finishing parts are cut away after the coating layer is formed simultaneously on the first and second surface treatment regions), and the anti-corrosion layer is formed in the first and second surface treatment regions in the same step (the anti-corrosion layer is formed simultaneously in the first and second surface treatment regions). Therefore, the efficiency of the entire surface treatment can be further improved.

The "precision finishing parts" refers to parts of a component of a fishing reel that are required to be finished to a predetermined (typically high) dimensional precision, such as parts of a bearing that supports a rotational drive shaft having a gear, rotational support parts, or slidable support parts. The "surface parts" refers to surface parts of the component of a fishing reel other than the precision finishing parts, including outer surface parts that are exposed to the outer environment and inner surface parts that are not exposed to the outer environment. Examples of the surface parts include the inner and outer surfaces of the reel body, the inner and outer surfaces of the cover member, the spool, and the rotor mounted to the reel body, the outer surface of the bait the inner and outer surfaces of the handle, and the drag adjustment parts. The present invention makes it possible to selectively apply the surface treatment to appropriate portions of a unitary member (the reel body, the cover member, the rotor, the handle, or the exterior members) as a component of a fishing reel, so as to form anti-corrosion layers having different characteristics in accordance with the required functionality (support of a drive part with a high precision, color tones for bright and substantial external appearance, and corrosion resistance). As a result, the practical performance of the component is significantly increased.

Advantages

The present invention provides a component of a fishing reel that make it possible to achieve precise finished dimensions and improve the efficiency of the entire surface treatment while maintaining the bright and substantial external appearance with a metallic feeling and corrosion resistance.

DESCRIPTION OF THE EMBODIMENTS

A component of a fishing reel according to an embodiment of the invention will be hereinafter described with reference to the drawings. First, the schematic constitution of a spinning reel, an example of the fishing reel to which the present invention is applicable, will be hereinafter described with reference to FIG. 1, before the component of the fishing reel according to an embodiment of the present invention is described.

Figure 1:
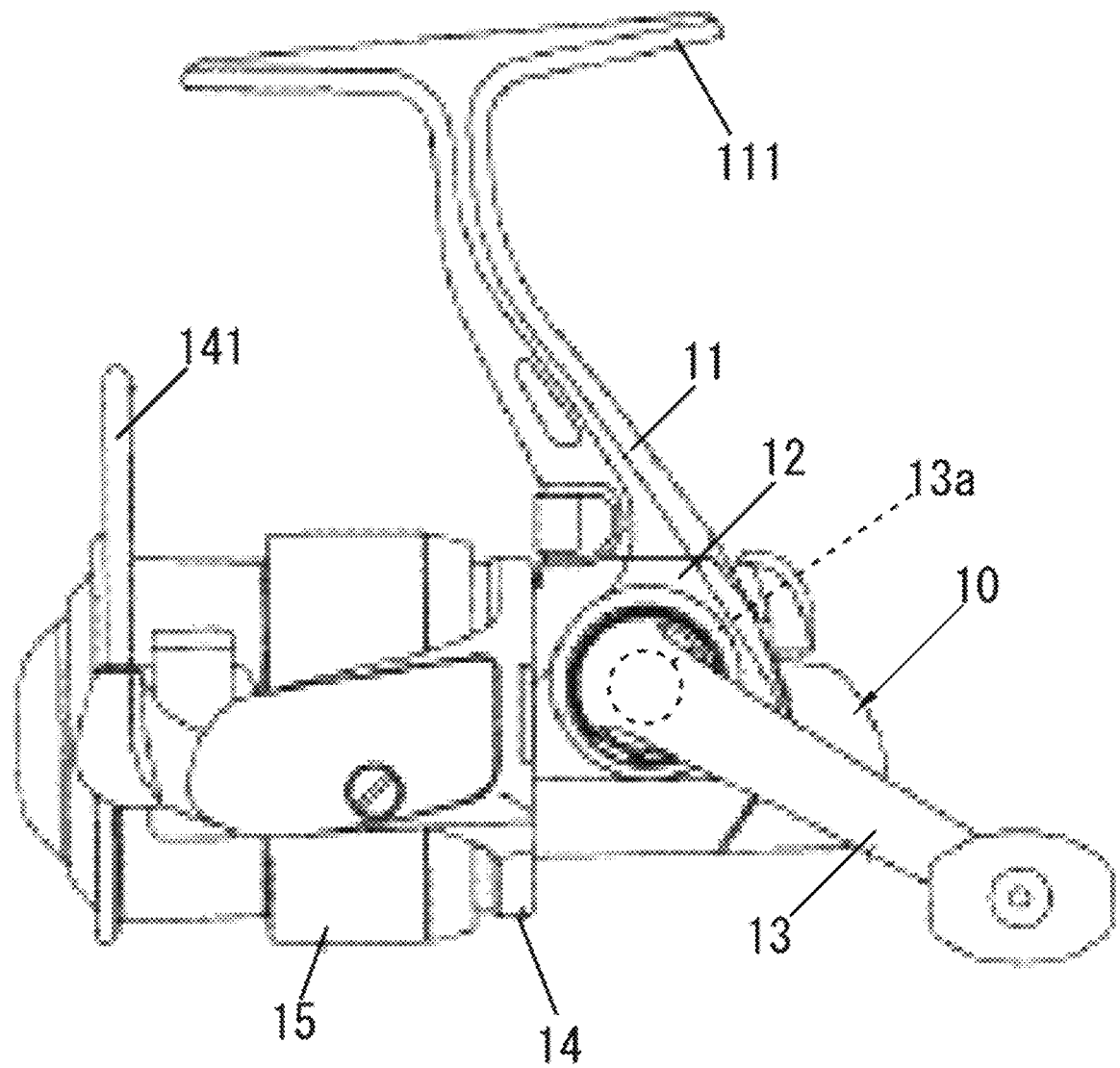
FIG. 1 is a schematic side view of a spinning reel (a fishing reel) including a component of a fishing reel according to an embodiment of the present invention.

As shown in FIG. 1, the spinning reel as a fishing reel includes a reel body 10. From the reel body 10 extends a leg part 11 having a rod mounting part 111 to be mounted to a fishing rod (not shown), and a cover member 12 is removably attached to a part of the reel body 10. The reel body 10 including the leg part 11 and the cover member 12 is formed of, for example, a die-cast material, as will be described later.

The reel body 10 has a reel driving mechanism (not shown) including an oscillation mechanism and built in the reel body 10. The reel driving mechanism is connected to a rotor 14 and a spool 15 that are fastened to the reel body 10, so as to allow driving of the rotor 14 and the spool 15. An operation handle 13 is rotatably mounted to the reel body 10. The operation handle 13 is connected to the reel driving mechanism via a handle shaft 13a. The rotational operation of the operation handle 13 drives the rotor 14 and the spool 15 via the reel driving mechanism.

In other words, in association with the rotational operation of the operation handle 13, the reel driving mechanism causes the spool 15 to reciprocate in the front-rear direction for constant strokes along a spool shaft (not shown) and causes the rotor 14 to rotate.

The rotor 14 is provided with a bail 141 for guiding a fishing line. In association with the rotation of the rotor 14, the bail 141 guides the fishing line (not shown) uniformly around the spool 15 for winding around the spool 15.

Next, a component of the fishing reel according to an embodiment of the invention will be described for the case where it is applied to the reel body 10.

Figure 2:
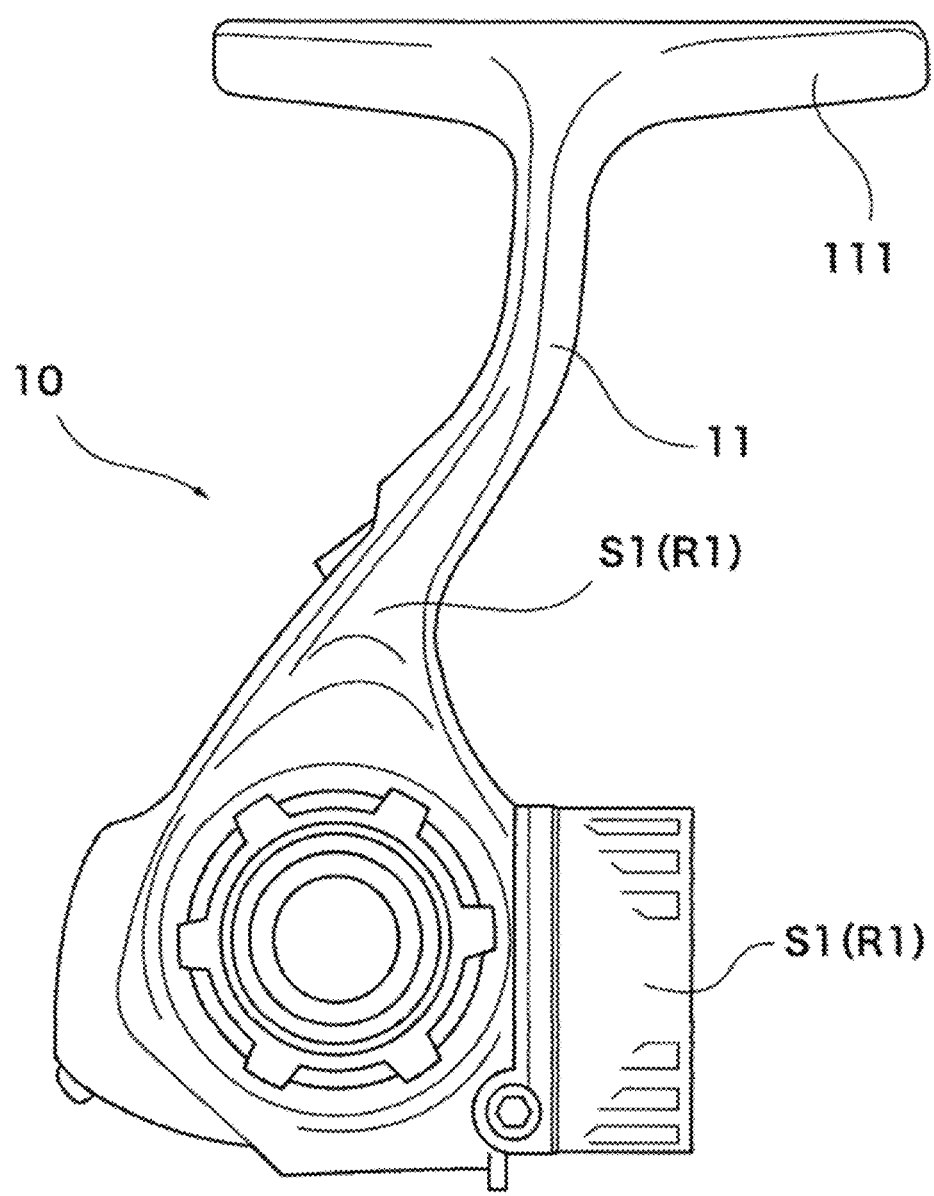
FIG. 2 is a side view of a reel body of the spinning reel shown in FIG. 1 viewed from outside, this side view mainly showing outer surface parts of the reel body.
Figure 3:
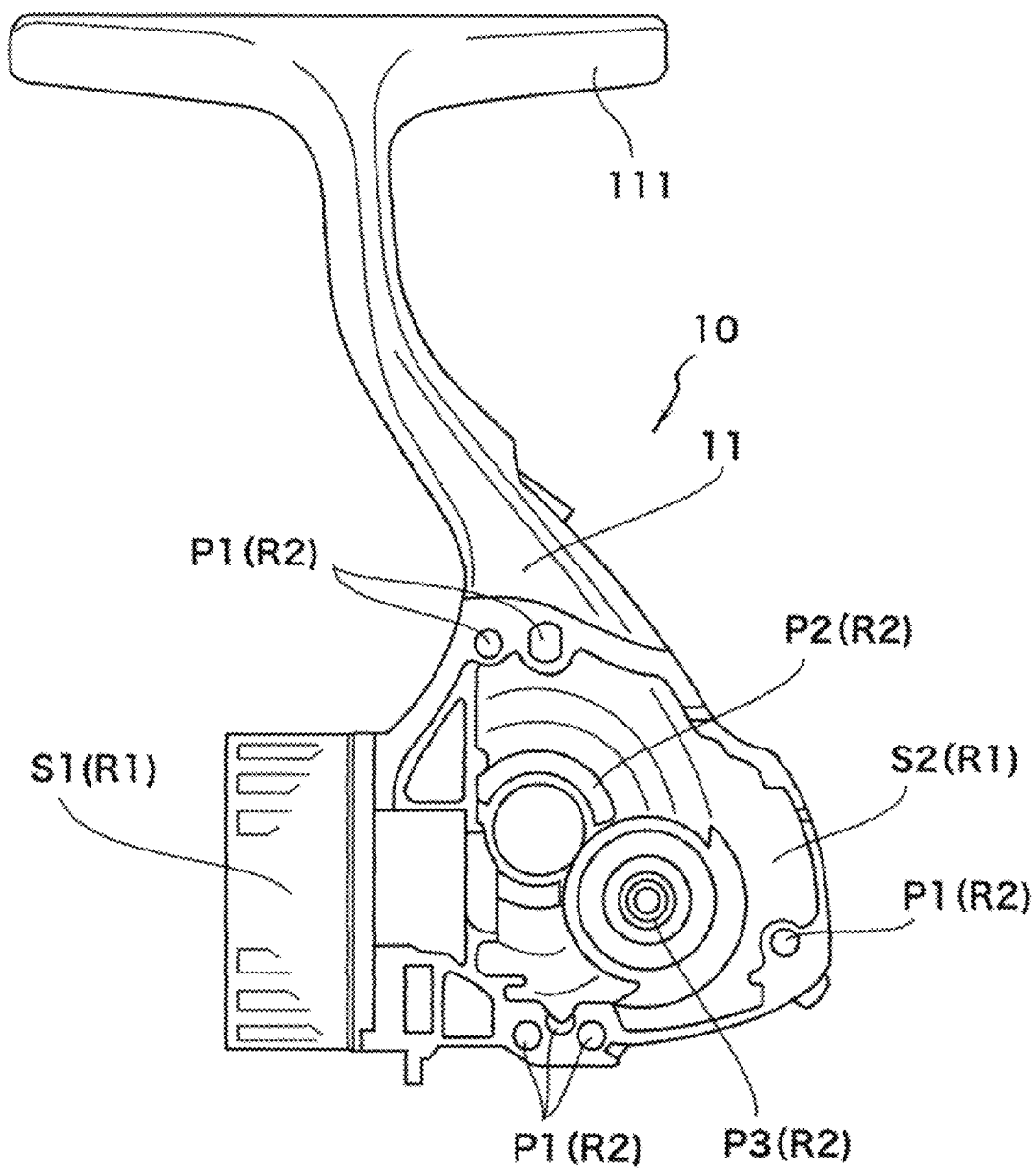
FIG. 3 is a side view of the reel body of the spinning reel shown in FIG. 1 viewed from inside, this side view mainly showing inner surface parts and precision finishing parts.

As described above, the reel body 10 including the leg part 11 is formed of a die-cast mold, and as shown in FIGS. 2 and 3, the reel body 10 as a unitary member includes, in appropriate portions thereof, regions having anti-corrosion layers of different characteristics, that is, a first surface treatment region R1 and a second surface treatment region R2. The first surface treatment region R1 includes a coating layer and an anodic oxide film, the coating layer being formed on the die-cast mold and formed of aluminum with a higher aluminum purity than the die-cast mold, the anodic oxide film being formed on the coating layer by anodic oxidation. The second surface treatment region R2 includes an anodic oxide film formed on the die-cast mold by anodic oxidation. These anodic oxide films serve as anti-corrosion layers for the coating layer and the die-cast mold.

The reel body 10 includes precision finishing parts P that are required to be finished to a predetermined dimensional precision and surface parts S other than the precision finishing parts. The surface parts S correspond to the first surface treatment region R1, and the precision finishing parts P correspond to the second surface treatment region R2. The precision finishing parts P refer to parts of the reel body 10 that are required to be finished to a predetermined (typically high) dimensional precision, and the precision finishing parts P include screw holes P1 and support parts that rotatably support drive shafts via bearings, such as a bearing installation part P2 that supports a handle shaft 13a (a drive shaft) and a support part P3 that supports a gear. The surface parts S are surface parts of the reel body 10 other than the precision finishing parts P, and the surface parts S include outer surface parts S1 that are exposed to the outer environment and inner surface parts S2 that are not exposed to the outer environment.

Figure 4:
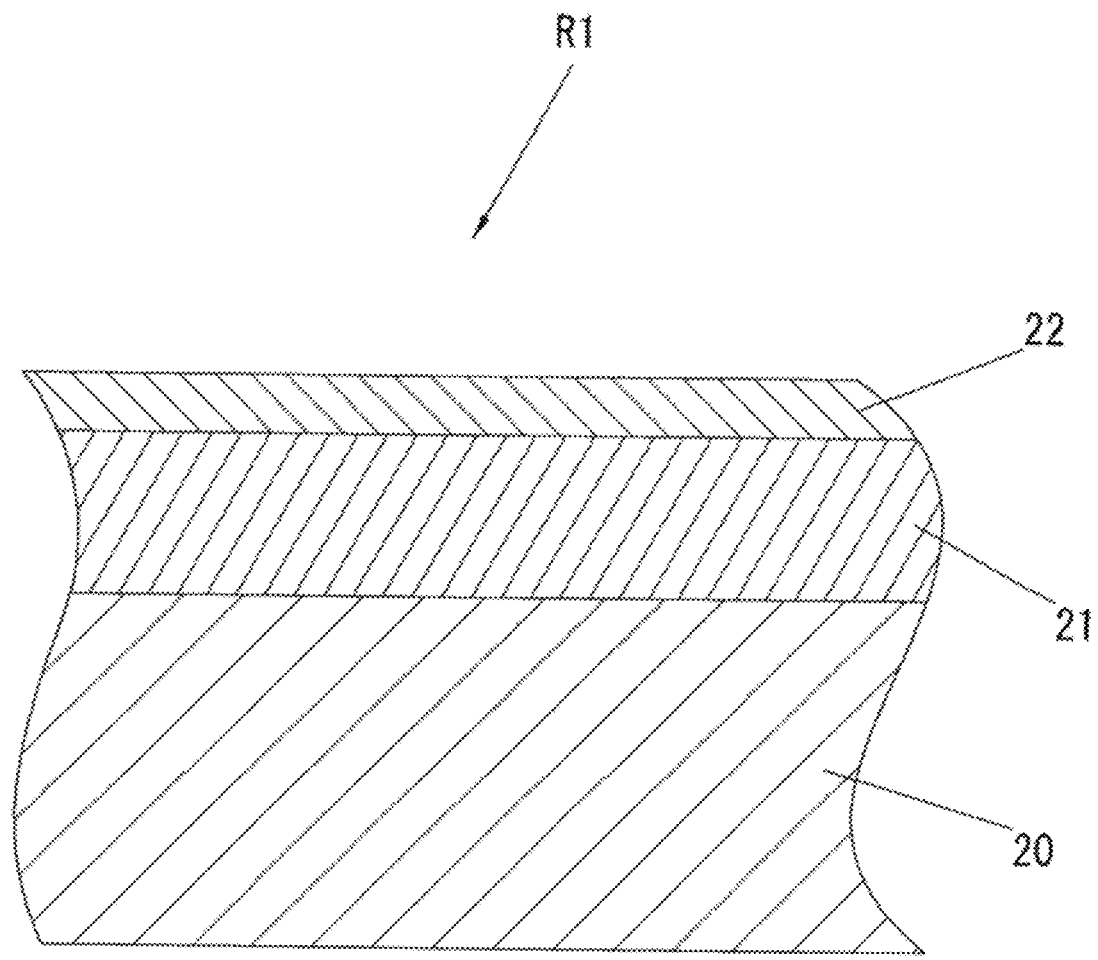
FIG. 4 is a sectional view of a lamination structure in a first surface treatment region of the component of the fishing reel according to an embodiment of the present invention.
Figure 5:
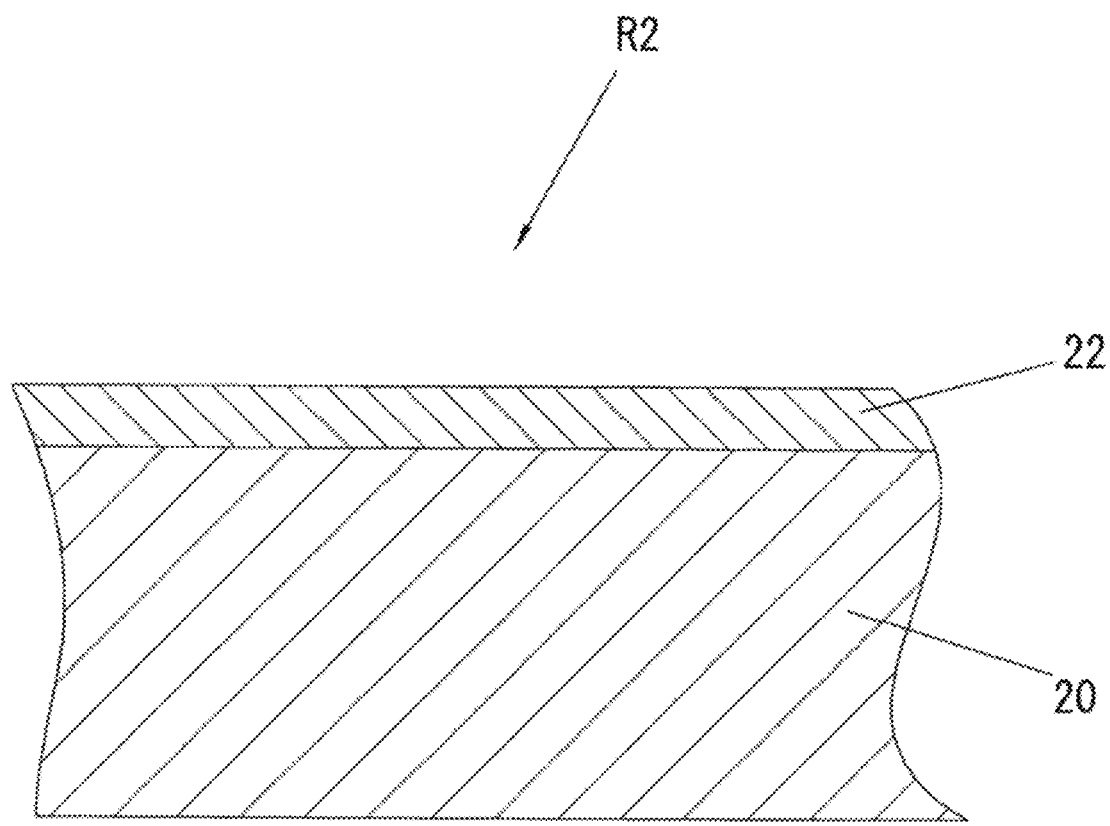
FIG. 5 is a sectional view of a lamination structure in a second surface treatment region of the component of the fishing reel according to an embodiment of the present invention.

As shown in FIG. 4, the first surface treatment region R1 of the reel body 10 includes a coating layer 21 formed of aluminum and an alumite layer 22 that serves as an anti-corrosion layer, and these layers are stacked sequentially on a die-cast mold 20. As shown in FIG. 5, the second surface treatment region R2 of the reel body 10 includes the alumite layer 22 stacked on the die-cast mold 20.

Figure 6:
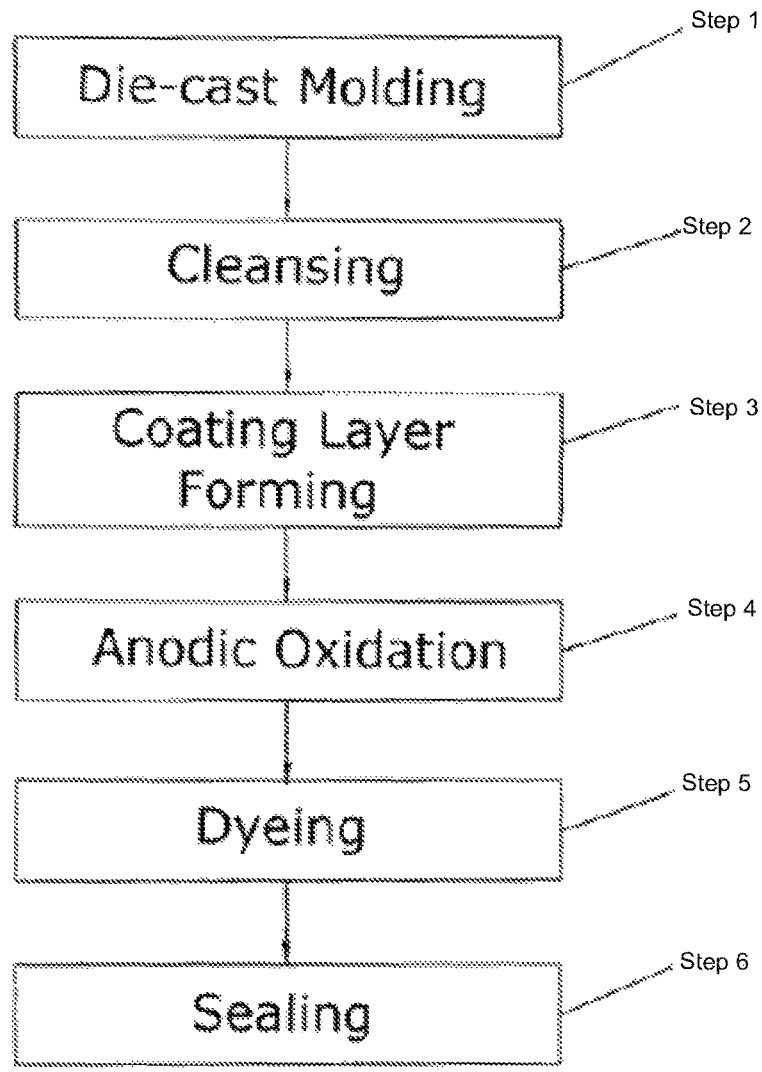
FIG. 6 is a flowchart showing an example of a surface treatment process in the first surface treatment region.

More specifically, as shown in FIG. 6, the process of forming the first surface treatment region R1 of the reel body 10 starts with a die-cast molding step S1, in which the mold 20 is formed to a desired shape by the conventional die-casting method, or casting a molten die-cast material such as an aluminum alloy containing 7% or more silicon (Si) (for example, ADC1, ADC3, ADC10, ADC12, etc.) into a die and applying a high pressure. Subsequently, in the cleansing step S2, the die-cast mold 20 is subjected to conventional degreasing and chemical polishing treatments and proceeds to the aluminum coating layer forming step S3.

In the coating layer forming step S3, aluminum powder particles with a higher aluminum purity than the die-cast mold, for example, 99% or higher (pure aluminum) are sprayed onto the surface of the mold 20 to form the coating layer 21 to a thickness of 10 μm to 100 μm. The spraying of the aluminum powder particles is preferably performed by the conventional impact coating method called cold spraying, in view of smoothness and uniformity of the surface. The coating layer 21 is formed by spraying the aluminum powder particles selectively onto the entire surface (the inner and outer surface parts S1, S2) of the mold, only the outer surface parts S1 that are exposed, or only a part of the outer surface, in accordance with, for example, the location of the component. Alternatively, the coating layer 21 may be formed by vapor deposition, and in particular by sheet-based physical vapor deposition. In this way, the coating layer 21 can be formed to a large thickness. Fine unevenness may be formed in the surface of the mold 20 before the coating layer 21 is stacked, thereby to beneficially increase the adhesion of the coating layer 21 to the mold 20. The coating layer 21 formed on the mold 20 is then subjected to barrel polishing, shot polishing, buff polishing, or other polishing processes on the surface thereof.

Since the coating layer 21 has a thickness of 10 μm to 100 μm for example, spraying of the aluminum powder particles onto the mold 20 can be freed from the influence of the die-cast material, and the irregularity of the coating can be minimized. Therefore, it is possible to achieve a desired dimensional precision of the product. When the coating layer 21 is formed, for example, on minimum necessary areas of the mold 20 and is not formed on the other areas (that is, the coating layer 21 is not formed in the second surface treatment region R2 corresponding to the precision finishing parts P), forming the coating layer can be facilitated with almost no influence on the dimensional precision of the product.

Next, in the anodic oxidation step S4, the mold 20 having the coating layer 21 formed thereon is subjected to anodic oxidation, for example, the alumite treatment on the entire surface thereof including the coating layer 21, thereby to form the alumite layer 22 serving as an anti-corrosion layer on the surface thereof including the coating layer 21.

In the mold 20 having the alumite layer 22 formed on the surface thereof including the coating layer 21, the alumite layer 22 formed on the coating layer 21 has a high hardness (for example, a Vickers hardness of about 800 Hv) because of the action of the coating layer 21. Also, the alumite layer 22 formed on the coating layer 21 of the mold 20 has a higher wear resistance than that formed directly on the die-cast mold because of the action of the coating layer 21, and such alumite layer 22 also has a bright external appearance with a metallic feeling.

Thus, the alumite layer 22 on the coating layer 21 is less apt to scratches and has brightness, and therefore, it can resist strain, corrosion, rust and the like, resulting in higher endurance.

The mold 22 having the alumite layer 22 formed thereon by anodic oxidation proceeds as necessary to the dyeing step S5 in which the mold is dyed at, for example, a circumferential surface thereof, and then it proceeds to the sealing step S6 in which it is subjected to the sealing process, thus being finished to be the reel body 10.

Figure 7:
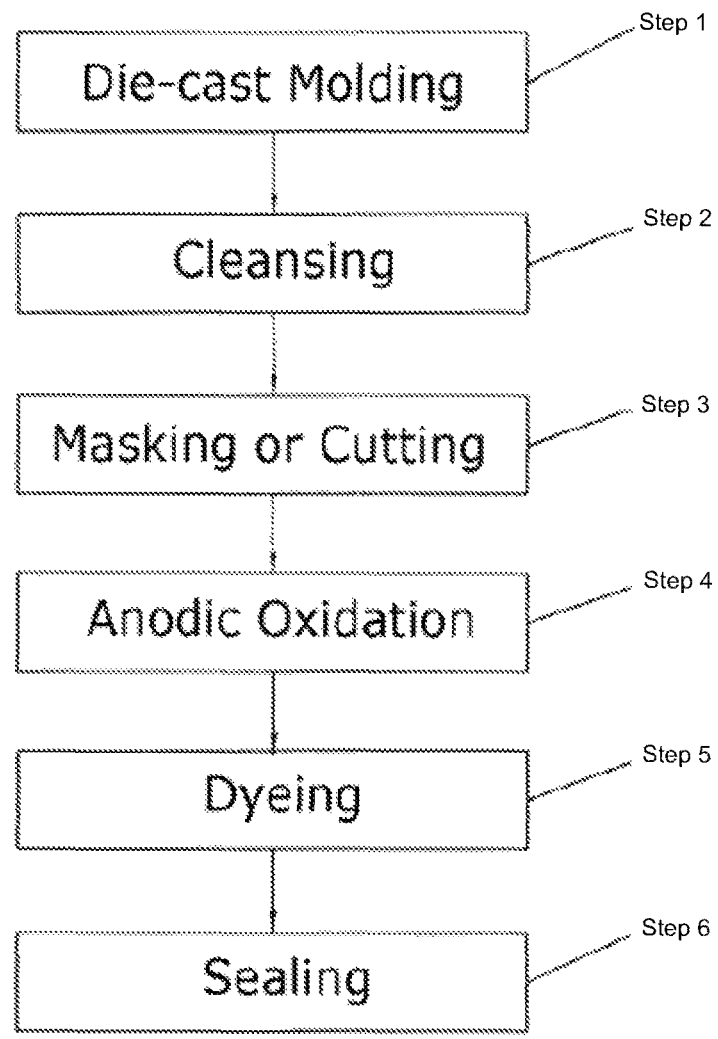
FIG. 7 is a flowchart showing an example of a surface treatment process in the second surface treatment region.
Figure 8:
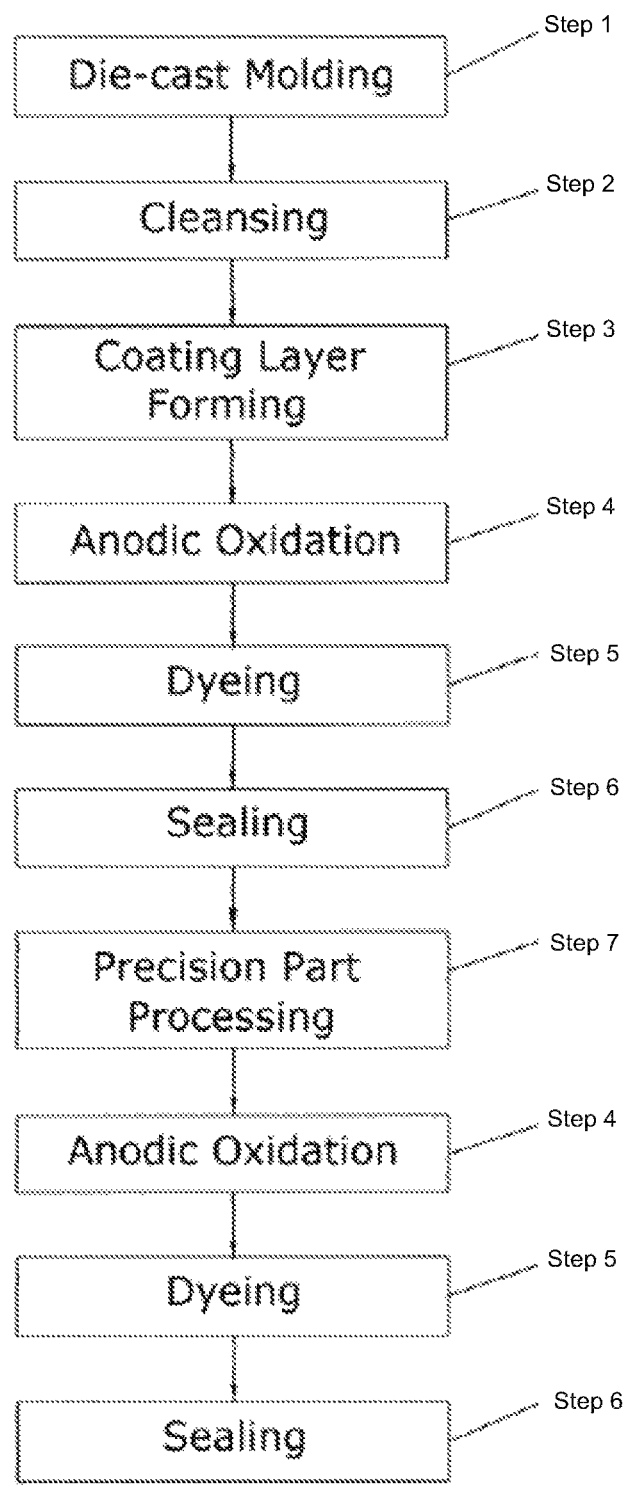
FIG. 8 is a flowchart showing another example of the surface treatment process in the first surface treatment region.
Figure 9:
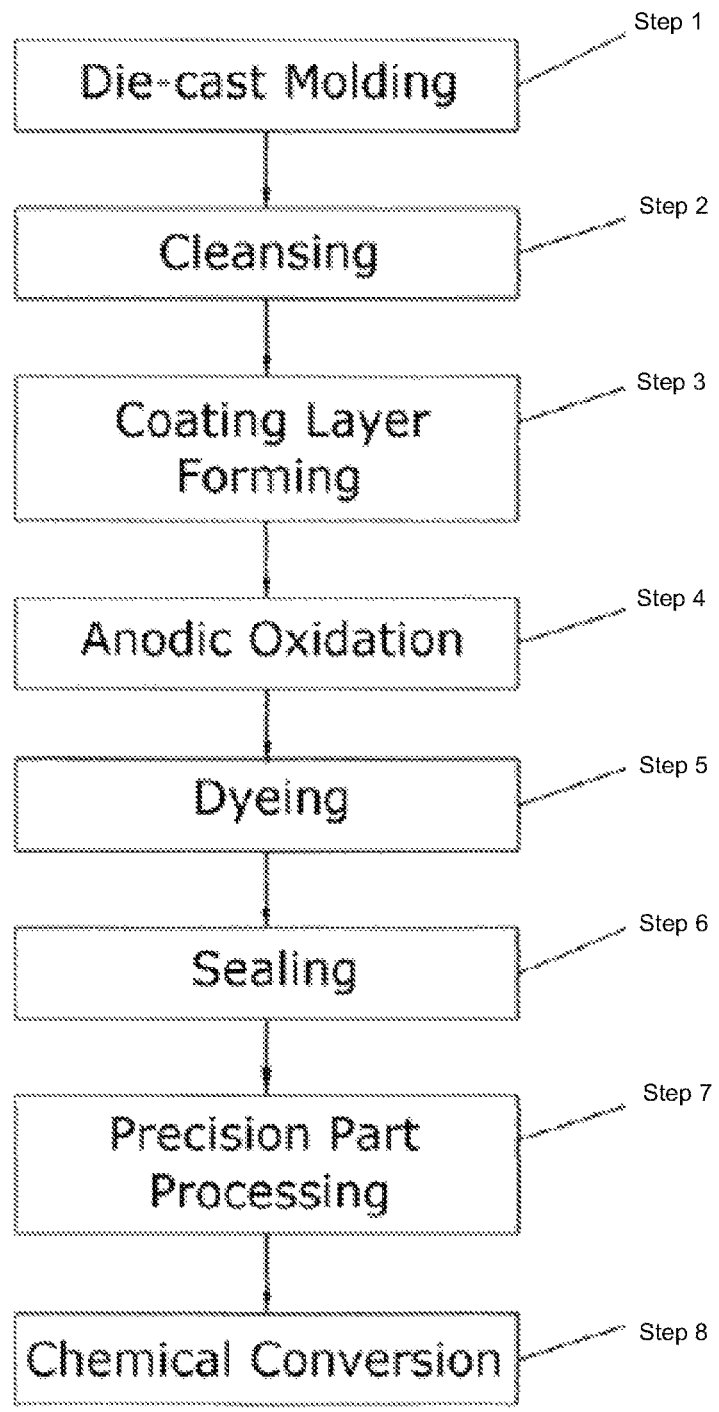
FIG. 9 is a flowchart showing still another example of the surface treatment process in the first surface treatment region.

As shown in FIG. 7, the process of forming the second surface treatment region R2 of the reel body 10 is different from the process shown in FIG. 6 only in that the coating layer forming step S3 is replaced with the masking or cutting step S3', and therefore, all the steps other than the step of forming the coating layer 21 are the same as those of the process of forming the first surface treatment region R1. In other words, the process of forming the second surface treatment region R2 includes the step of masking the precision finishing parts P corresponding to the second surface treatment region R2 when forming the coating layer 21 in the first surface treatment region R1, or the step of cutting away the coating layer on the precision finishing parts P after forming the coating layer simultaneously in the first and second surface treatment regions R1, R2, and these steps are followed by the anodic oxidation step S4. In the latter case, it is also possible to omit the step of cutting away the coating layer before forming the alumite layer and append the step of cutting and the step of forming an additional alumite layer. More specifically, as shown in FIG. 8, the sealing step S6 may be followed by processing of the precision finishing parts P (the precision part processing step S7), with subsequent repetition of the anodic oxidation step S4, the dyeing step S5, and the sealing step S6. Alternatively, as shown in FIG. 9, the steps after the precision part processing step S7 may be replaced with the chemical conversion step S8.

To achieve surface characteristics that excel particularly in any one of brightness, corrosion resistance, wear resistance, and scratch resistance after anodic oxidation, it is important to control the thicknesses of the coating layer 21 and the alumite layer 22. For example, a higher brightness can be achieved when the coating layer 21 has a thickness of 10 μm or smaller and the alumite layer 22 has a thickness of 5 μm or smaller. As the thickness of the coating layer 21 is smaller, the surface of the coating layer 21 is more smooth, and as the thickness of the alumite layer 22 is smaller, the alumite layer 22 has lower corrosion resistance but a higher luster. It is also possible that, after the coating layer 21 is formed, the coating layer 21 is subjected to buff polishing or chemical polishing and then the alumite layer 22 is formed to a thickness of 5 μm or smaller. Alternatively, it is also possible that the coating layer 21 has a thickness of 30 μm or larger and the alumite layer 22 has a thickness of 5 μm or smaller, so as to achieve a high luster.

To achieve surface characteristics that excel particularly in corrosion resistance, it is preferable that the coating layer 21 has a thickness of 15 m or smaller and the alumite layer 22 has a thickness of 10 μm or larger. Further, to achieve wear resistance and scratch resistance in addition to corrosion resistance, it is preferable that the coating layer 21 has a thickness of 15 μm or smaller and the alumite layer 22 is made of hard alumite to a thickness of 10 μm or larger.

Die-cast materials other than ADC can also be used to produce an alumite external appearance with a high brightness. For example, it is also possible to form the coating layer 21 and the alumite layer 22 on a magnesium alloy material. In this case, anodic oxidation may be performed with a magnesium-dedicated treatment liquid, before formation of the coating layer and the alumite treatment. This replaces electrodeposition coating and produces a decorative external appearance (eliminates the need of decorative coating). Further, it is also possible to coat resin parts with pure aluminum before the alumite treatment. In this case, the resin should be non-conductive such that the alumite treatment is possible.

According to the embodiment as described above, in the first surface treatment region R1, the anti-corrosion layer (the alumite layer) 22 formed on the coating layer 21 by anodic oxidation has an increased corrosion resistance and rust resistance and also has a bright and substantial external appearance with a metallic feeling, as well as a high surface hardness, because of the action of the coating layer 21 made of high purity aluminum (pure aluminum). The second surface treatment region R2 is inferior to the first surface treatment region R1 in the quality of the bright and substantial external appearance with a metallic feeling, but it has a sufficient corrosion resistance and a high wear resistance against scratches that result in a higher endurance, and in addition, absence of the coating layer 21 simplifies the surface treatment and facilitates finishing to a high dimensional precision.

Particularly in the embodiment, the precision finishing parts P of the reel component (the die-cast mold) required to be finished to a predetermined dimensional precision are formed as the second surface treatment region R2, and the surface parts S of the reel component other than the precision finishing parts P are formed as the first surface treatment region R1. The precision finishing parts P are generally subject to a severe dimensional tolerance and have an elaborate shape, and therefore, it is difficult and takes much effort to form the coating layer 21 on the precision finishing parts P. Moreover, when the coating layer 21 is formed on the precision finishing parts P, it is difficult to achieve a high dimensional precision and to accomplish desired precision finishing. In the embodiment, the precision finishing parts P are arranged to correspond to the second surface treatment region R2 where the coating layer 21 is absent, such that the precision finishing parts P can be finished to a high dimensional precision, while the surface parts P (the first surface treatment region R1) maintains a bright and substantial external appearance with a metallic feeling and corrosion resistance. As a result, the efficiency of the entire surface treatment can be improved. Particularly in the embodiment, the precision finishing parts P are masked when the coating layer 21 is formed (or the coating layer on the precision finishing parts P are cut away after the coating layer 21 is formed simultaneously on the first and second surface treatment regions R1, R2), and the anti-corrosion layer 22 is formed in the first and second surface treatment regions R1, R2 in the same step (the anti-corrosion layer 22 is formed simultaneously in the first and second surface treatment regions R1, R2). Therefore, the efficiency of the entire surface treatment can be further improved.

The present invention is not limited to the above embodiment but is capable of various modification within the purport thereof. For example, the above embodiment is configured such that the inner surface parts S2 are included in the first surface treatment region R1, but it is also possible that the inner surface parts S2 are included in the second surface treatment region R2 together with the precision finishing parts P, because the inner surface parts S2 are not exposed to the outside and are not required to have a bright and substantial external appearance with a metallic feeling and corrosion resistance. The above embodiment is configured such that the present invention is applicable to a component of a spinning reel, but the present invention is also applicable to components of other types of fishing reels such as double bearing reels. The above embodiment was described for a representative case where the present invention is applied to the reel body 10 as a component of a fishing reel, but this is not limitative. The present invention is also applicable to the cover member 12, the handle 13, the rotor 14, the spool 15 and the like so as to produce substantially the same effect. The above embodiment was described for a case where the shot coating process is used to spray aluminum powder particles to form the aluminum coating layer 21 on the mold 20 of a die-cast material, but this is not limitative. It is also possible to use the vapor deposition process, the thermal spraying process, the hot-dip coating process and the like.

What is claimed is:

1. A component of a fishing reel formed of an aluminum alloy die-cast material, the component comprising:
   a first surface treatment region including a coating layer and an anodic oxide film, the coating layer being formed on the aluminum alloy die-cast material and formed of aluminum with a higher aluminum purity than the aluminum alloy die-cast material, the anodic oxide film being formed on the coating layer; and
   a second surface treatment region including an anodic oxide film formed on the aluminum alloy die-cast material,
   wherein the component is a unitary member including a precision finishing part that is required to be finished to a predetermined dimensional precision and a surface part other than the precision finishing part,
   wherein the surface part corresponds to the first surface treatment region, and the precision finishing part corresponds to the second surface treatment region, and
   wherein the precision finishing part is part of a bearing that supports a rotational drive shaft having a gear, rotational support parts, and slidable support parts.

2. The component of a fishing reel according to claim 1 wherein the first surface treatment is applied at least to an outer surface part that is exposed to an outside, and the second surface treatment is applied to a support part of a drive member.

3. A component of a fishing reel formed of an aluminum alloy die-cast material, the component comprising:
   a first surface treatment region including a coating layer and an anodic oxide film, the coating layer being formed on the aluminum alloy die-cast material and formed of aluminum with a higher aluminum purity than the aluminum alloy die-cast material, the anodic oxide film being formed on the coating layer; and a second surface treatment region including an anodic oxide film formed on the aluminum alloy die-cast material, wherein the component includes a precision finishing part that is required to be finished to a predetermined dimensional precision and a surface part other than the precision finishing part, wherein the surface part corresponds to the first surface treatment region, and the precision finishing part corresponds to the second surface treatment region, and wherein the second surface treatment region of the precision finishing part is positioned directly adjacent to at least one of a rotational drive shaft having a gear, rotational support parts, and slidable support parts.

4. A method of processing a surface of the component according to claim 1, the method comprising:
    forming the coating layer on both the surface part and the precision finishing part;
    removing the coating layer from the precision finishing part; and
    forming the anodic oxide film on the precision finishing part.

5. The component of a fishing reel according to claim 1, wherein a thickness of the coating layer of the first surface treatment region is equal to or less than 15 μm, and a thickness of the anodic oxide film of the first surface treatment region is equal to or greater than 10 μm.

6. A method of processing a surface of the component according to claim 3, the method comprising:
    forming the coating layer on both the surface part and the precision finishing part;
    removing the coating layer from the precision finishing part; and
    forming the anodic oxide film on the precision finishing part.

7. The component of a fishing reel according to claim 3, wherein a thickness of the coating layer of the first surface treatment region is equal to or less than 15 μm, and a thickness of the anodic oxide film of the first surface treatment region is equal to or greater than 10 μm.

\* \* \* \* \*

UNITED STATES PATENT AND TRADEMARK OFFICE
CERTIFICATE OF CORRECTION

| | |
|---|---|
| PATENT NO. | : 12,016,319 B2 |
| APPLICATION NO. | : 16/244726 |
| DATED | : June 25, 2024 |
| INVENTOR(S) | : Koike |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this
Third Day of December, 2024

Katherine Kelly Vidal
*Director of the United States Patent and Trademark Office*